June 22, 1965 H. FLEISHER ETAL 3,191,012

MEMORY READOUT AND SUMMING SYSTEM

Filed Aug. 24, 1961 7 Sheets-Sheet 1

INVENTORS
HAROLD FLEISHER
ROBERT I. ROTH

BY Joe L. Koerber
ATTORNEY

June 22, 1965 H. FLEISHER ETAL 3,191,012

MEMORY READOUT AND SUMMING SYSTEM

Filed Aug. 24, 1961

7 Sheets-Sheet 2

June 22, 1965 H. FLEISHER ETAL 3,191,012

MEMORY READOUT AND SUMMING SYSTEM

Filed Aug. 24, 1961 7 Sheets-Sheet 3

3,191,012

MEMORY READOUT AND SUMMING SYSTEM

Harold Fleisher, Poughkeepsie, and Robert I. Roth, Briarcliff Manor, N.Y., assignors to International Business Machines Corporation, New York, N.Y., a corporation of New York

**Filed Aug. 24, 1961, Ser. No. 133,679
9 Claims. (Cl. 235—164)**

Figures 1, 1A:
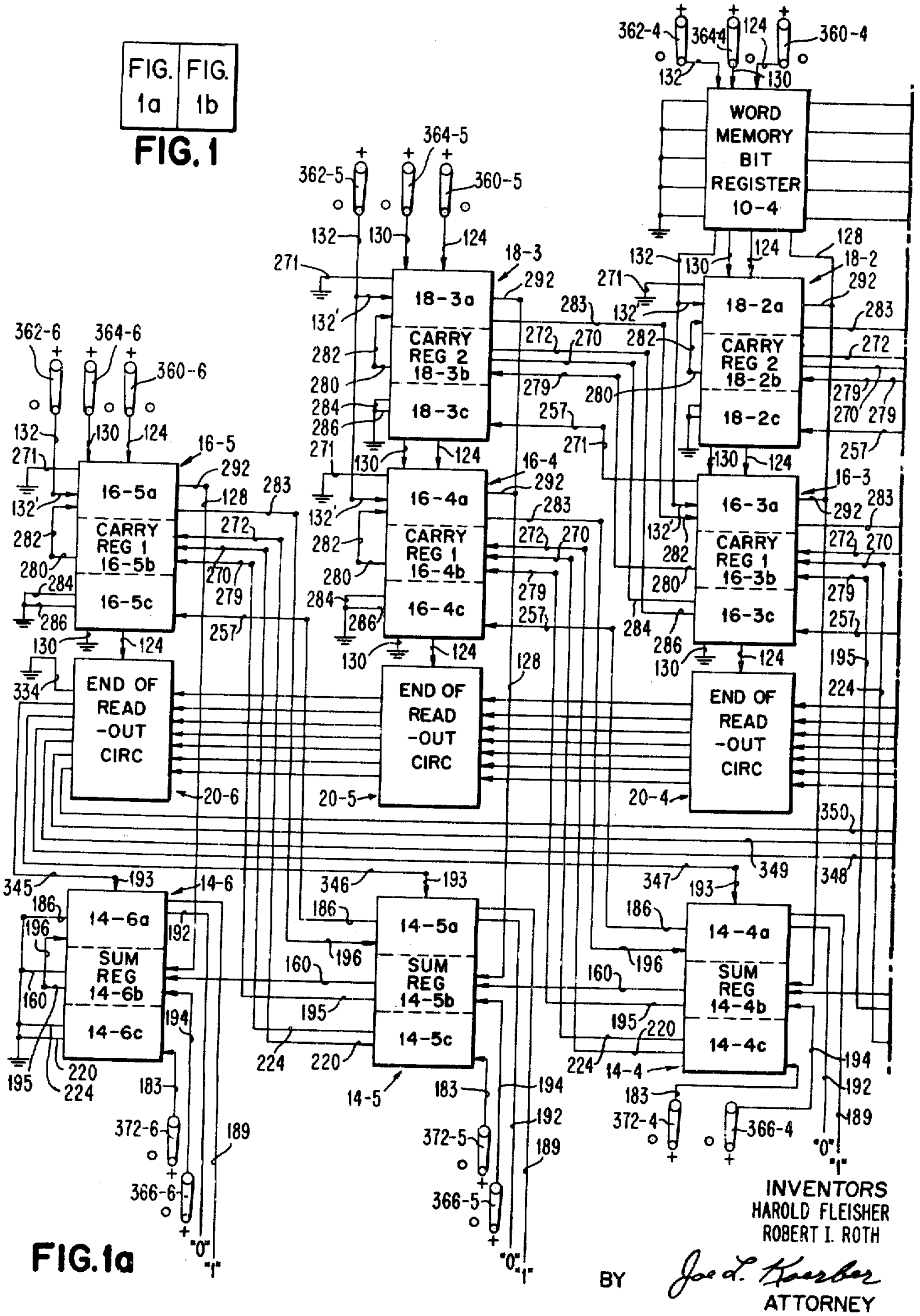

This invention relates to a memory readout system and more particularly to a system for reading out data parallel by bit to a summing circuit by repetitive groups of pulses.

This type of system is particularly adaptable to use with an associative memory system where particular fields of particular memory words are identified and binary 1 bits in these fields are to be read out to counters.

The closest known prior art is a system described in copending application Serial Number 120,213, filed June 28, 1961 on behalf of H. Fleisher and R. I. Roth and assigned to the assignee of this invention. However, the system in the above cited application provides for serial-by-word, parallel-by-bit read out of selected words wherein all words are compared simultaneously with an association word and indications of matches and mismatches are stored in a single column indicating circuit. Thereafter, read out pulses are applied to enable a single word and each pulse applied to a bit position of that word flow out of the memory on a binary 1 line or a binary 0 line in accordance with the binary state of the particular bit position.

The present system is asynchronous in the sense that the read out is parallel-by-bit without regard to whether the binary data read out at a given time are in the same or different memory words. The readout signal applied to each column of memory flows directly to the first bit position storing a binary 1 and reads the binary 1 out. The next read out pulse reads out the next following binary 1.

When the last binary 1 has been read from a particular column, which may either follow, precede or occur at the same time as the reading of the last binary 1 from other columns, the next following readout signal applied to that column flows to an associated carry register to readout a binary 1 carry value which may be stored therein. A plurality of carry registers associated with a column are read out in the same manner as the memory storage positions.

It is thus apparent that each readout signal applied to a memory column is effective to readout a binary 1 as long as one remains stored anywhere in the column.

The binary 1's read out of memory are immediately entered into a summing register and summed with a binary value therein.

Accordingly, it is a primairy object of this invention to provide improved apparatus for parallel memory readout.

Another object of this invention is to provide an improved memory readout and adding system.

A further object of this invention is to provide an improved binary counter.

Yet another object of this invention is to provide an improved asynchronous system for extracting and summing data from a memory.

Another object of this invention is to provide an improved summing device adapted for delayed adding of carries.

The foregoing and other objects, features and advantages of the invention will be apparent from the following more particular description of preferred embodiments of the invention, as illustrated in the accompanying drawings.

Figure 1B:
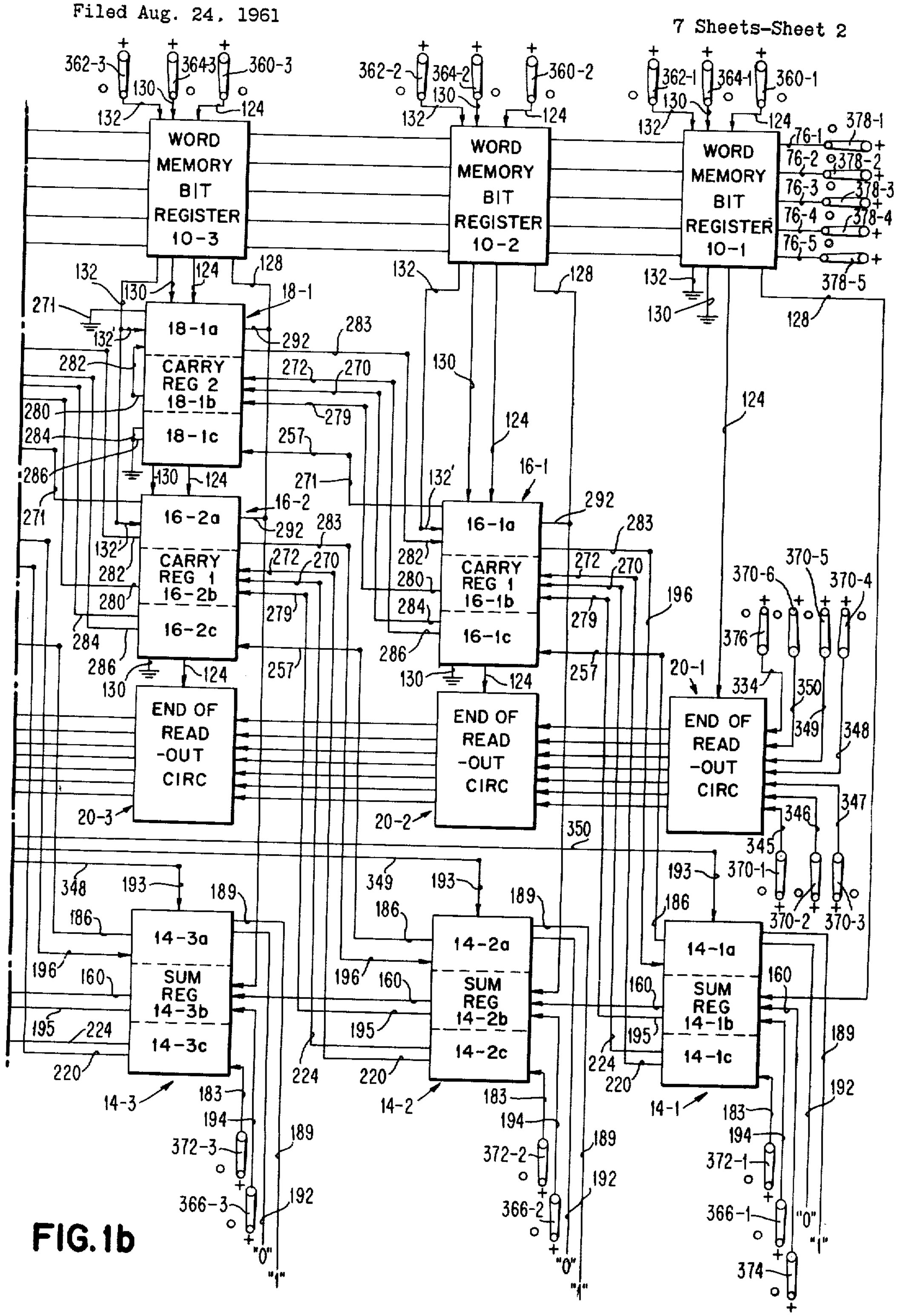

In the darwings:

FIGURE 1 shows the arrangement of FIGURES 1*a* and 1*b* to form a circuit schematic.

FIGURES 1*a* and 1*b* taken together form a circuit schematic of the novel system.

Figure 2A:
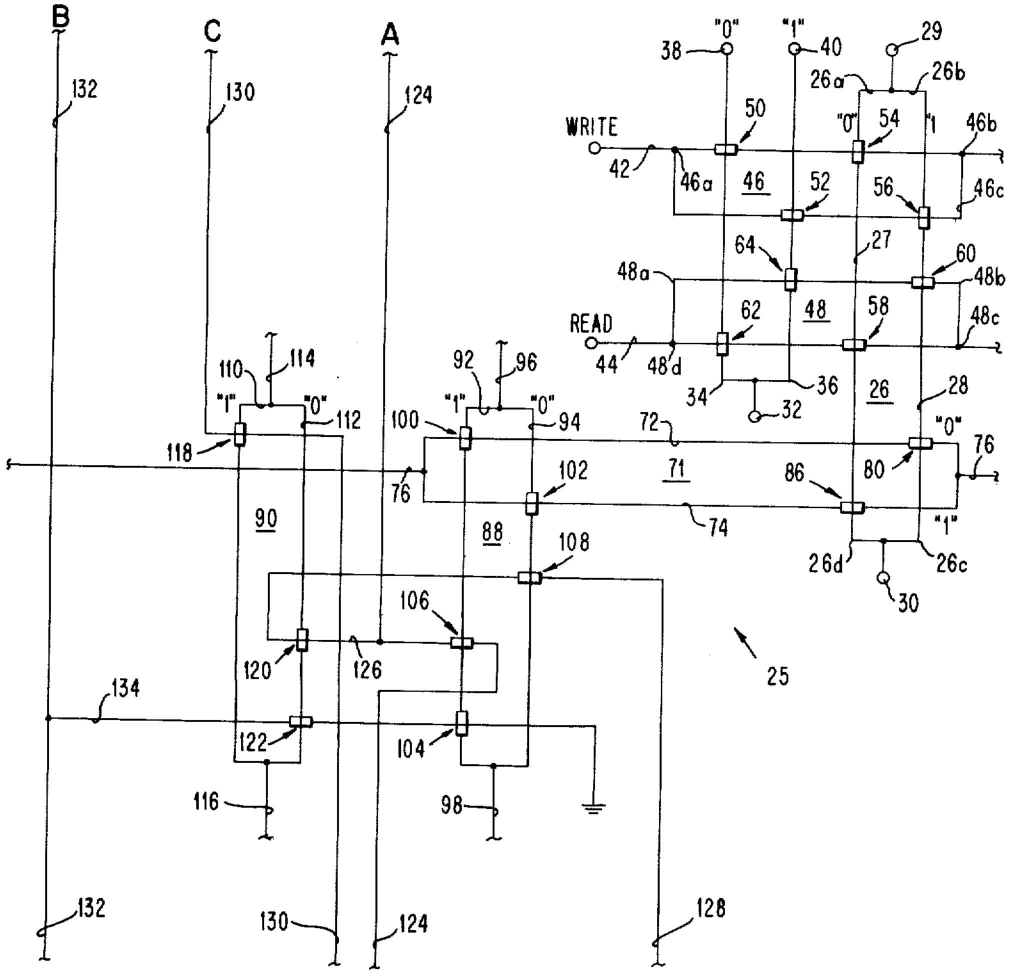

FIGURE 2*a* is a detailed showing of a bit register.

Figure 2B:
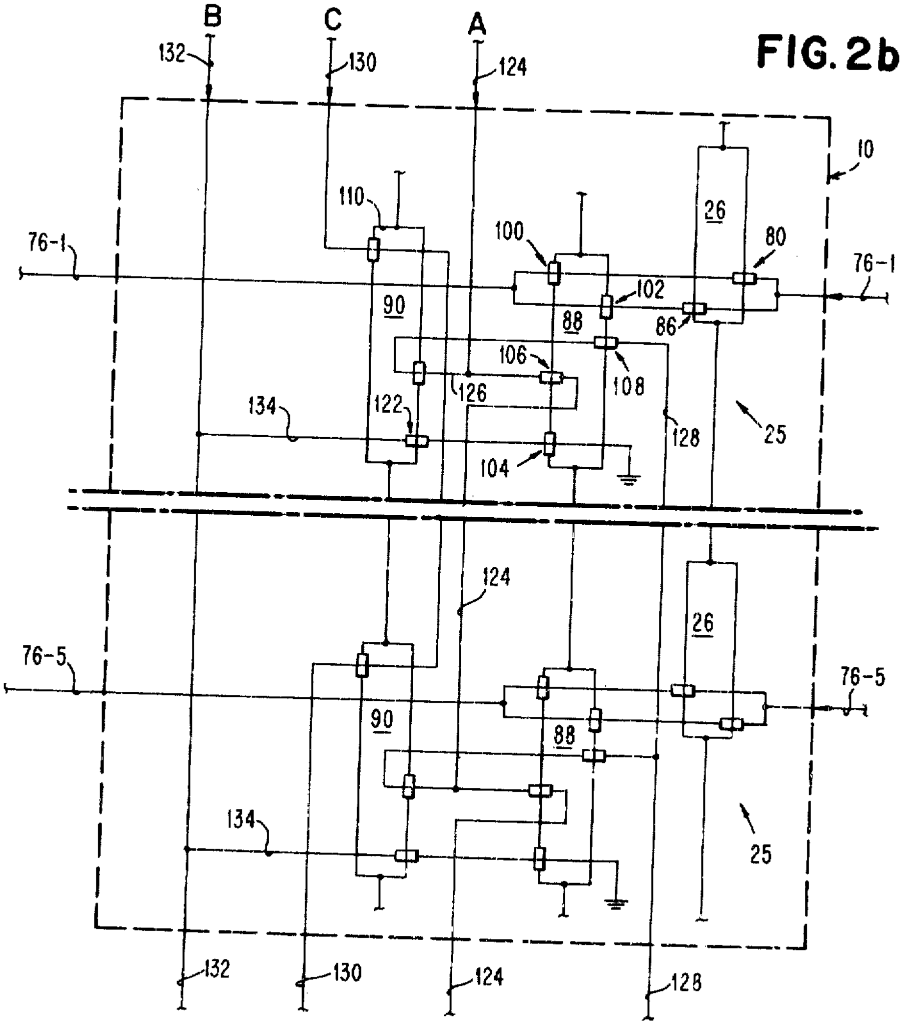

FIGURE 2*b* shows the operative relationship between plural bit registers.

Figure 2C:
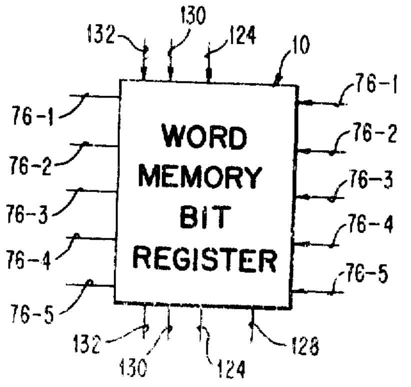

FIGURE 2*c* shows a schematic representation of a column of bit registers illustrated in FIGURE 2*b*.

Figure 3A:
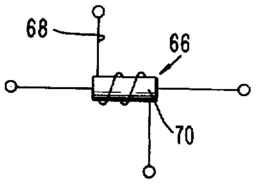
Figure 3B:
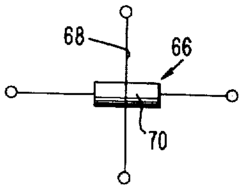

FIGURES 3*a* and 3*b* show schematic representations of cryogenic gate elements.

Figure 4A:
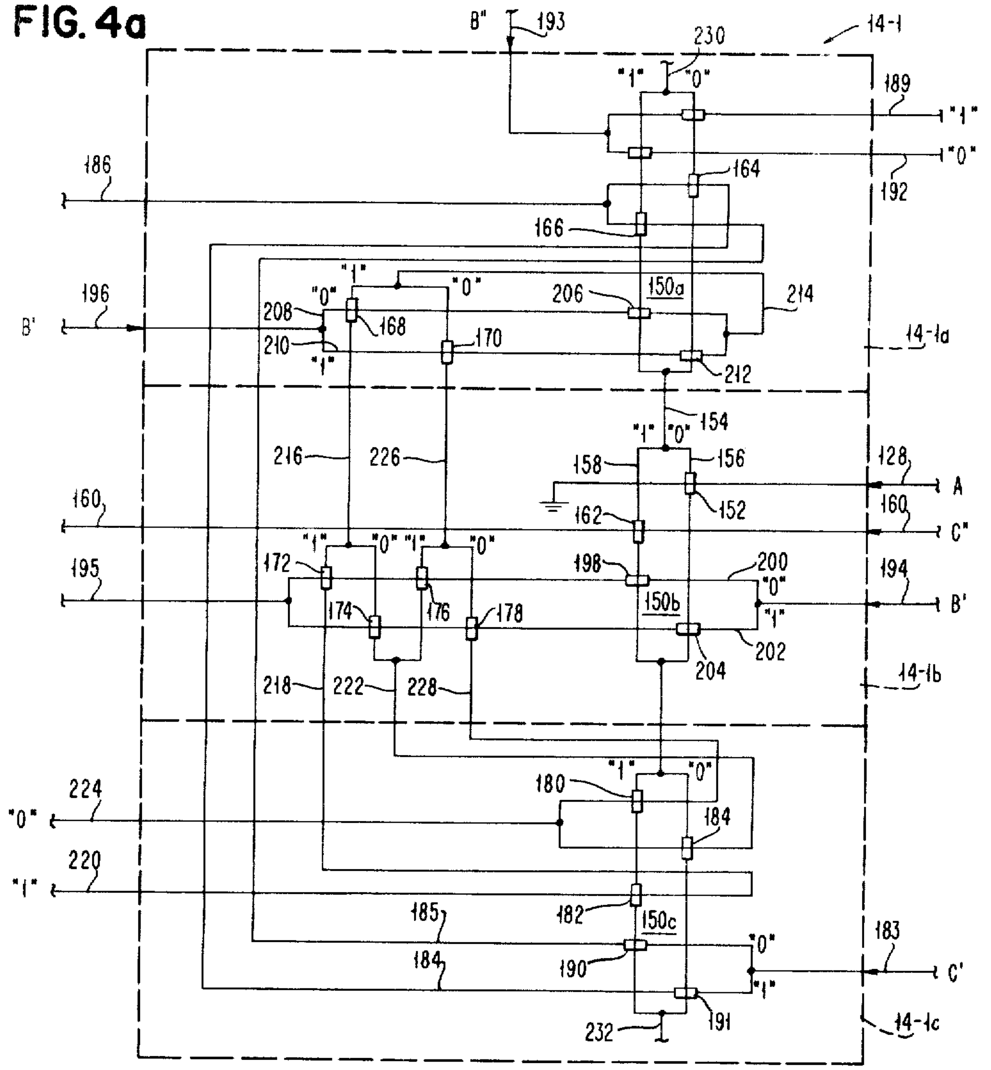

FIGURE 4*a* shows a detailed schematic of a sum register.

Figure 4B:
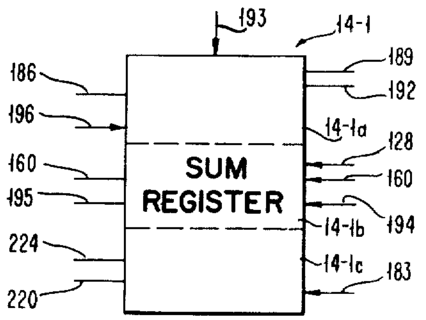

FIGURE 4*b* shows a schematic representation of the sum register of FIGURE 4*a*.

Figure 5A:
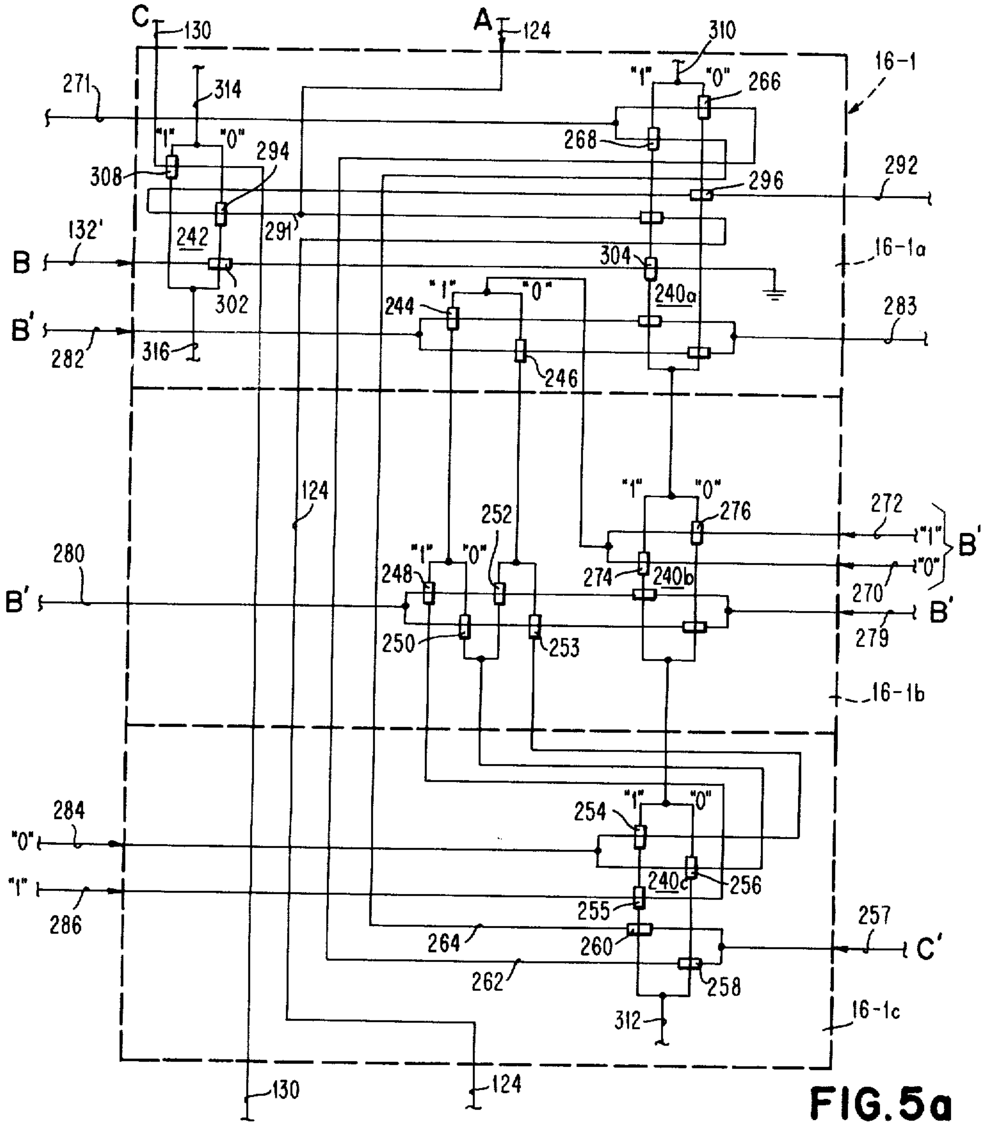

FIGURE 5*a* shows a detailed schematic of a carry register.

Figure 5B:
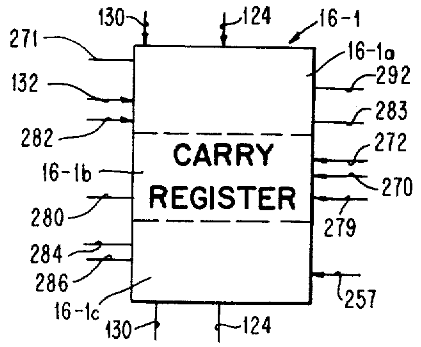

FIGURE 5*b* shows a schematic representation of the carry register of FIGURE 5*a*.

Figure 6A:
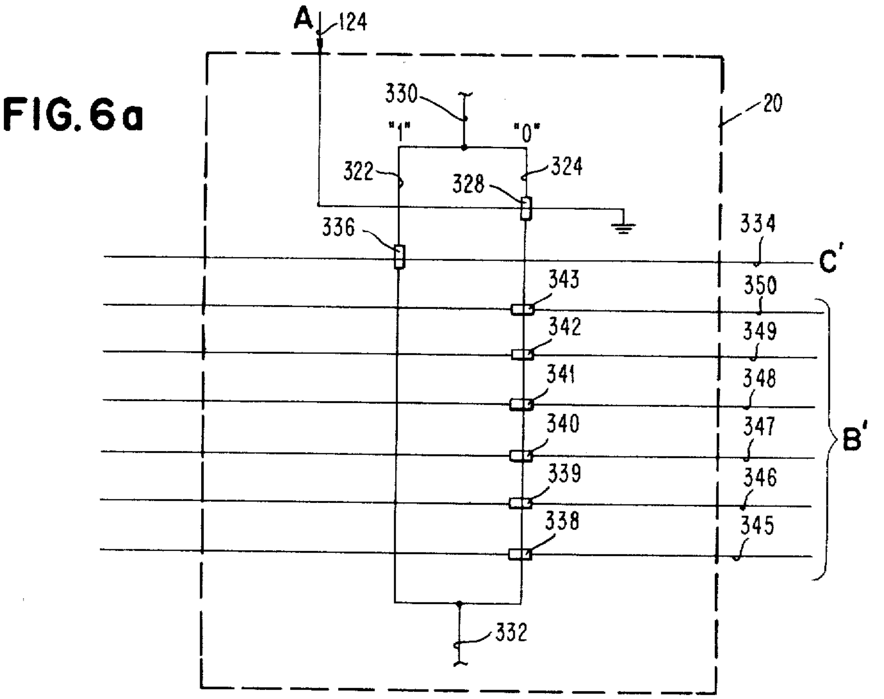

FIGURE 6*a* shows a detailed schematic of an end of readout circuit.

Figure 6B:
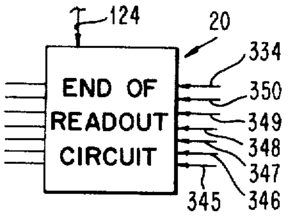

FIGURE 6*b* shows a schematic representation of the end of readout circuit of FIGURE 6*a*.

Figure 7:
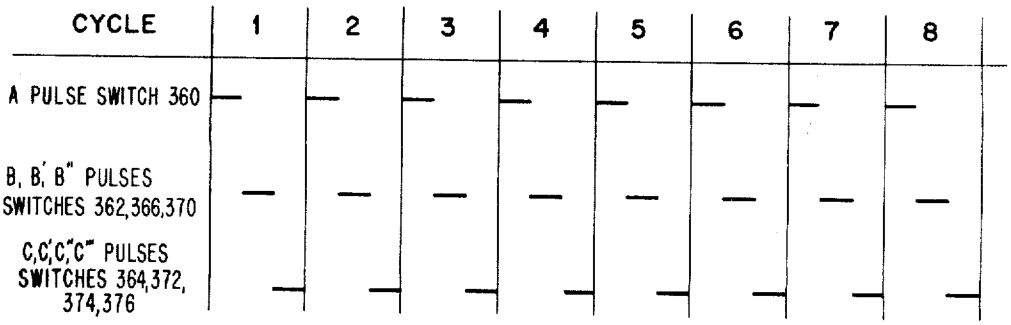

FIGURE 7 is a timing chart.

*General Description*

This system includes an $n$ x $m$ bit memory arranged in $n$ word rows and $m$ bit columns and register unit consisting of a sum register for each of the $m$ columns plus sufficient registers to accommodate carries.

Each sum register except the highest order one is provided with a first order carry register in the next higher order column to receive carries from the associated sum register. First order carry registers are provided with second order carry registers; second order carry registers provided with third order carry registers; etc. The number of orders of carry registers depends upon the maximum number of carries which may be propagated and therefore upon the number of words in memory since all readout and adding of stored data in a column is accomplished before the carry registers in that column are interrogated for carries.

Readout signals are periodically applied at the top of each column. Each readout signal is effective to read out data stored in the first bit position as the signal flows through the column from top to bottom.

A stored binary 1 is considered stored data whereas a stored binary 0 is considered as absence of stored data. After the data are read out of that bit position, the register is reset whereby the next applied readout signal will pass on to the next folliwing position which stores data.

After all stored data have been read out of a particular column of memory, the next applied readout signal flows through that column of memory to the carry registers which are arranged in the column. In a manner similar to the readout of memory, the readout signal reads stored data from the first encountered carry register which contains stored data. The next readout signal is effective to read out the next following carry register data.

An end-of-readout indicator circuit is provided for each column of the system to indicate when all data have been read from the particular column of memory and associated carry registers. Asynchronously operating interrogation means are provided to detect when all end-of-readout circuits have been actuated after which the contents of the sum register unit may be read out.

Referring to FIGURES 1*a* and 1*b*, a system schematic is illustrated including a word memory and a counting circuit. The memory consists of four blocks designated word memory bit register and further designated 10–1, 10–2, 10–3 and 10–4, representing plural words of four binary bits each. While only four bit registers are shown, it will be understood that the system may consist of any suitable number of registers 10, depending upon the desired word length. In the example described hereinafter, a five word memory is assumed but it will be understood that, in practice, the memory would consist of a larger number of words.

The counting circuit consists of sum registers or accumulators 14, first carry registers 16, second carry registers 18, and end-of-readout check circuits 20. The sum registers 14–1, 14–2, 14–3 and 14–4 correspond to the word memory bit registers 10–1, 10–2, 10–3 and 10–4. In addition, two sum registers herein designated 14–5 and 14–6 are provided for storing carry sums beyond the sum register 14–4.

A first order carry register 16–1 arranged in the second column from the right under word memory bit register 10–2 is adapted to receive carries from sum register 14–1. A second order carry register 18–1 is arranged in the third column with the word memory bit register 10–3 to receive carries from carry register 16–1. Similarly, carry registers 16–2 and 18–2 are arranged to receive carries from sum register 14–2 and carry register 16–2 respectively. In a similar manner carry register 16–3 and 18–3 are provided as well as carry registers 16–4 and 16–5. End-of-readout check circuits designated 20–1, 20–2, 20–3, 20–4, 20–5 and 20–6, one for each sum register 14, are provided.

It will be apparent how the expansion of the four bit words in memory will require additional units 14, 16, 18 and 20. While two orders of carry registers are sufficient for a five word memory, it will become apparent, as the description progresses, that a memory consisting of a larger number of words will require additional orders of carry registers to store carries which are propagated from the lowest order carry registers. It will be apparent that the number of orders of carry registers may be expanded, to the extent required by the particular memory used, without departing from the scope of this invention since all carry registers are identical and the interconnection of successive orders of carry registers is identical.

Binary 1 data bits in the word memory are read out, essentially parallel-by-bit, into the corresponding sum registers 14–1 to 14–4, and carries are propagated to the corresponding carry registers 16.

The read out is parallel-by-bit but without regard to whether the bits are in the same or different words. In each bit position the first binary 1 encountered, reading from the top of the memory down, is read out by a first group of readout pulses, the second binary 1 in each bit position is read out by a second group of readout pulses, etc. Assume, for example, that the four bit positions of the five words of memory contain the following binary bits.

| Word | 4 | 3 | 2 | 1 |
|---|---|---|---|---|
| 1 | 1 | 1 | 1 | 1 |
| 2 | 0 | 1 | 1 | 1 |
| 3 | 0 | 1 | 1 | 1 |
| 4 | 0 | 1 | 1 | 1 |
| 5 | 1 | 0 | 0 | 1 |

The first group of readout pulses reads out the binary 1's in word 1(W1), bit position 4(B4), W1, B3; W1, B2; W1, B1. The second group of pulses reads out W5, B4; W2, B3; W2, B2; and W2, B1.

If a binary 1 is being read out from a word memory bit position in one column after all binary 1's have been read out of another column, the readout pulse in the latter column will read a binary 1 carry from the corresponding carry register 18, if one is present, and if a binary 1 carry is not stored there, will read a binary 1 carry from the corresponding carry register 16, if one is stored therein. Thus it is apparent that a readout pulse introduced into a particular bit column, including one or more of the components 10, 16 and 18, will read out the first binary 1 stored in the memory 10. In successive cycles after having read out all binary 1's from the particular column word memory bit registers, the readout pulses will then read out carries first from the carry register 18 and then from the carry register 16.

Before describing the circuit operation, a description is provided of the various blocks which are illustrated in FIGS. 1*a* and 1*b*. Thereafter, the description of the circuit shown in FIGS. 1*a* and 1*b* will refer only to the block representations.

*Word memory*

Referring to FIG. 2*a*, a typical word memory bit register is illustrated. The register generally designated 25 includes a storage loop 26 which is defined by the points 26*a*, 26*b*, 26*c* and 26*d*. The leg of the loop defined by points 26*a*, 26*d* is hereafter referred to as line 27. The leg defined by the points 26*b*, 26*c* is referred to as line 28. Current is supplied to the storage loop 26 through a terminal 29 at the top and exists through a terminal 30 at the bottom. Direct current applied to the terminal 29 remains on as long as the register 25 is in operation.

During a read operation current is applied to a terminal 32 and flows along one of the vertical lines 34 or 36. Current on the line 36 represents a binary 1. Current on the line 34 represents a binary 0. Current on the line 34 or 36 is supplied to a corresponding terminal 38 or 40 which may be connected to a load device (not shown). During a write operation, current is supplied to one of the vertical lines 34 or 36 by an input device (not shown) which may be connected to terminal 38 or 40.

Register 25 has a write line 42 and a read line 44. The write line 42 includes a control loop 46, and the read line 33 includes a sense loop 48. Each of the foregoing loops is defined by points *a*, *b*, *c* and *d* associated with the loop number. The control loop 46 includes cryotrons 50 and 52. The storage loop 26 includes cryotrons 54 and 56. The sense loop 48 includes cryotrons 58 and 60. The line 34 includes a cryotron 62 and the line 36 includes a cryotron 64. The foregoing gate elements have control windings as follows: gate 54, line 46*a*–46*b*; gate 56, line 46*d*–46*c*; gate 64, line 48*a*–48*b*; gate 62, line 48*d*–48*c*; gate 50, line 34; gate 52, line 36; gate 58, line 27; gate 60, line 28.

Referring to FIGURE 3*a*, a cryotron 66 is illustrated as having a control winding 68 disposed about the cryotron gate element 70. While this cryotron is represented as a conventional wire wound cryotron, it is to be understood that other types of cryotrons may be used. The circuit schematic of cryotron 66 in FIG. 3*a* is depicted in FIG. 3*b* in a simplified form. The same reference numerals employed in FIG. 3*a* are used in FIGURE 3*b* to designate corresponding parts. The simplified showing of FIG. 3*b* is employed in the various circuit schematics to represent a cryotron gate element.

The circuits of this invention are operated at low temperatures such as by immersion in liquid helium. Current in the control winding 68 is employed to create a magnetic field which exceeds the critical field of the cryotron gate to drive the cryotron resistive. When no current flows in the control winding of the cryotron, the gate element is superconductive and current flows therethrough.

Information from an external device may be written into the register 25 or information stored in the register may be read to an external device. To illustrate a wiring operation, assume that a binary 1 is to be written in register 25. First, the register is placed in the operative condition by applying direct current to terminal 29. This current remains on as long as the register remains in operation. Next, an information signal is supplied to the vertical line 36. To store a binary 0 bit, current would be applied to line 34. Only one of the two lines is energized at any one time.

A current is applied next to the write line 42. Current on the line 36 drives the gate 52 resistive. Consequently, current on the write line 42 is diverted from that portion of the control loop 46 defined by the points 46–*a*, *d*, *c* and *b*, to that portion of the loop defined by the points 46*a* and 46*b*. Current flowing in this leg of the loop drives the gate 54 resistive whereby current from the terminal 29 is diverted to the line 28. Current flowing in the line 28 is arbitrarily designated as representing a binary 1. Current flowing in the line 27 is arbitrarily designated as representing a binary 0. Thus, a binary 1 is writtten in the register 25. At this point, the current on the write line 42 may be terminated and the information signal represented by the current applied to the terminal 40 may be terminated.

A binary 0 is stored by applying a current to line 34 instead of to line 36, thus driving the gate 50 resistive whereby current in the loop 46 is diverted to that portion of the loop defined by the points 46*a*, 46*d*, 46*c* and 46*b*. Current in this leg of the loop 46 drives the gate 56 resistive whereby current from the terminal 29 is diverted to the line 27.

To illustrate a read operation, assume that a binary 1 stored in register 25 is to be read out. Current applied to the terminal 29 during the write operation remains on. Current is applied to the terminal 32 and to the read line 44. It is permissible to energize the terminal 32 and the read line 44 simultaneously.

The current in the line 28 representing the stored binary 1 drives the gate 60 resistive, whereby current on the read line 44 is diverted through that portion of the control loop 48 defined by the points 48*d* and 48*c*. Current in this portion of the control loop drives the gate 62 resistive and diverts current from the terminal 32 to the vertical line 36. The binary 1 read from register 25 is thus supplied to a utilizing device via the terminal 40. At this point the current on the read line 44 and the terminal 32 may be terminated. The direct current signal applied to the terminal 29 is maintained.

If a binary 0 is in the register 25 when the currents are applied to terminal 32 and line 44, the gate 58 is resistive whereby the current applied to terminal 44 is diverted through that portion of the loop 48 defined by the points 48*d* 48*a*, 48*b* and 48*c*, thus driving the gate 64 resistive and diverting the current applied to terminal 32 through the binary 0 line 34 to the terminal 38.

For a more detailed description of this register, reference may be made to application Serial Number 30,019, filed May 18, 1960 and assigned to the assignee of this invention.

Referring again to FIG. 2*a* the register disclosed in application Serial Number 30,019 and described hereinbefore is modified by the addition of a read loop 71 comprising lines 72 and 74 connected in parallel in a line 76. The line 72 includes a cryotron gate 80 having as a control winding the line 28 of storage loop 26. The line 74 includes a cryotron gate 86 having as a control winding the line 27 of storage loop 26.

A pair of cryogenic flip-flops 88 and 90 form a part of the memory cell 25. The loop 71 links a pair of parallel connected lines 92 and 94 which form the flip-flop 88. The lines 92 and 94 are common connected through a line 96 to a source of direct current and through a line 98 to ground. The ground connection may be either direct or through a series of similar loops. The line 92 contains a cryotron gate element 100 having the line 72 for a control winding. The line 94 contains a cryotron gate element 102 which has the line 74 for a control winding. The line 92 also contains a cryotron gate element 104 and forms the control winding for a gate element 106. The line 94 forms the control winding for a cryotron gate element 108. The flip-flop 90 consists of parallel connected lines 110 and 112 connected between a direct current power source and ground via lines 114 and 116, similar to the connection of flip-flop 88. The line 110 includes a cryotron gate element 118. The line 112 includes a cryotron gate element 120 and forms a control winding for a gate element 122.

With a binary 0 or a binary 1 stored in the loop 26, an input pulse on the line 76 is directed through either the line 72 or 74 in accordance with the binary state of the loop 26 and transfers the binary digit from the loop 26 to the loop 88 by rendering either the cryotron gate 100 or 102 resistive. With a binary 0 stored in the loop 26, current applied to the lines 76 flows through the line 72 and gate 80 rendering the gate element 100 resistive. Therefore, current applied to the line 96 flows in the line 94 rendering gate element 108 resistive, thus representing a binary 0 in flip-flop 88. With a binary 1 stored in the loop 26, current applied to the line 76 flows through the line 74 and gate 86 rendering the element 102 resistive and causing current representative of a binary 1 to flow in the line 92 rendering the gate element 106 resistive.

The word memory may be operated as an associative memory whereby data from memory register flip-flops 26 are transferred to the corresponding flip-flops 88 selectively in accordance with associative data. Since the association feature per se does not constitute a part of the present invention, the association circuitry is not illustrated. For the purposes of this invention, it is assumed that all binary 1's in the memory registers are to be read out and added.

To read a binary digit from the flip-flop 88, a current hereinafter referred to as an A pulse is applied to a line 124. If the flip-flop 88 stores a binary 1, the current is in the line 92 and the gate element 106 is resistive whereby the A pulse cannot flow through the gate element 106 and continue on the line 124, but is diverted through a line 126 which forms the control winding for gate element 120, through the gate element 108, and through a line 128 to a counter.

If the flip-flop 88 stores a binary 0, the gate 108 is resistive and the A pulse flows through the line 124, the gate element 106 and, via the line 124, to a next succeeding flip-flop 88 of another register to read out a binary 1 stored therein.

Following the A pulse, a B pulse is applied to a line 132 to reset the flip-flop 88 to its binary 0 state. The B pulse on line 132 is diverted through a line 134. Since gate element 120 is resistive, gate element 122 is superconductive. The pulse on line 134 flows through gate 122 and renders the gate element 104 resistive thus resetting flip-flop 88 to its binary 0 state by diverting current from the line 92 back to the line 94.

Following the B pulse, a C pulse is applied in a line 130 to reset the flip-flop 90 to the 0 state. This C pulse renders cryotron gate element 118 resistive to divert current on the line 110 back to the line 112.

Referring to FIGURE 2*b*, two bit registers 25 are illustrated. The circuits are somewhat abbreviated from that shown in FIGURE 2*a* for clarity of illustration. The two bit registers are arranged one above the other to illustrate their interconnecting and the manner of applying A, B and C pulses thereto. The break line indicates omission of identical units. The assembly including a plurality of registers 25 comprises a word memory bit register 10. An A pulse on the line 124 is permitted to flow through the gate element 106, if the flip-flop 88 stores a binary 0, or is diverted to the line 126, if the flip-flop 88 contains a binary 1.

If diverted to the line 126, the pulse emerges on the line 128 where it indicates the presence of a binary 1 in the flip-flop 88. If the A pulse is permitted to continue on line 124, it is directed in the next register 25 in accordance with the binary 0 or binary 1 state of the corresponding flip-flop 88. Thus it is seen that a column of bit registers may be interrogated by A pulses with each A pulse reading out the first encountered binary 1 bit by passing on line 124 sequentially through registers storing binary 0's until one is reached which contains a binary 1.

The B pulse on the line 132 is effective to reset the flip-flop 88 which has just had a binary 1 read therefrom. The flip-flop 90 corresponding to the flip-flop 88 which has just had the binary 1 read therefrom is then in the binary 1 state, that is, current is flowing in the line 110. Therefore, the B pulse on line 132 is diverted through the corresponding line 134 and through the superconductive gate element 122 to render the gate element 104 of flip-flop 88 resistive thereby resetting the flip-flop 88 to its binary 0 state. The current then flows to ground. The binary 0 state of other flip-flops 90 prevents the B pulse from flowing on other lines 134 and resetting to 0 the flip-flops 88 which have not yet been read out.

FIGURE 2*c* is a block schematic representation of a column of word memory bit registers 25. This block, designated 10, represents a column of registers of the type illustrated in FIGURES 2*a* and 2*b*, in this instance, five successive bit registers corresponding to words 1, 2, 3, 4 and 5. Five input lines 76–1 through 76–5 are shown entering the block 10 on the right and emerging on the left. The A pulse is shown entering at the top on line 124 and exiting at the bottom on line 124 or line 128. The B pulse is shown entering at the top on line 132 and exiting at the bottom. The C pulse is shown entering at the top on line 130 and exiting at the bottom. The word bit registers do not per se comprise a part of the present invention and therefore are illustrated in FIGS. 1*a* and 1*b* by the diagrammatic representation of FIGURE 2*c*.

*Sum register*

Referring to FIGURE 4*a*, a schematic representation of a typical sum register 14–1 is shown. Each sum register is divided into three sections designated *a, b* and *c*, for example, register 14–1 consists of sections **14–1*a*, 14–1*b* and 14–1*c*. The sum register includes three flip-flops designated 150*a*, 150*b* and 150*c*** corresponding to the sections *a, b,* and *c*. Each flip-flop consists of a pair of parallel connected lines similar to those described in the word bit registers hereinbefore. The current in the left hand line represents the storage of a binary 1, whereas current in the right hand line represents storage of a binary 0. A binary 1 count is first entered in a sum register flip-flop **150*b* by an A pulse on the line 128 from a corresponding word bit register 10 or from a carry register 16 or 18. This pulse renders a cryotron gate element 152 resistive thereby diverting current on a line 154 from the line 156 to the line 158. The flip-flop 150*b* is later reset to its binary 0 state by a C'' pulse on a line 160. The pulse on the line 160 renders a cryotron gate element 162 resistive thus diverting current back to the line 156**. The C'' pulses are coincident with the previously described C pulses (see the timing chart, FIG. 7).

A binary 1 is stored in the flip-flop **150*a* by rendering a gate element 164 resistive, whereas a binary 0 is stored therein by rendering a gate element 166 resistive. The binary contents of flip-flops 150*a* and 150*b* are added together by an adding tree consisting of cryotron gate elements 168, 170, 172, 174, 176 and 178. The binary sum of flip-flops 150*a* and 150*b* is stored in cryotron gate elements 180, 182 and 184 of flip-flop 150*c*. The contents of the flip-flop 150*c* are transferred to flip-flop 150*a* by a C' pulse on a line 183. The C' pulse emerges from the sum register on a line 186**.

The contents of the sum register, as stored in the flip-flop **150*a*, are read out on lines 189 and 192 by a B'' pulse applied to a line 193. An output on the line 192 is indicative of a binary 0, whereas an output on the line 189 is indicative of a binary 1**.

With a binary value, for example, a binary 1 stored in flip-flop **150*a*, and a binary 1 stored in flip-flop 150*b* by an A pulse on the line 128, a B' pulse applied to a line 194 is directed by the resistive state of gate element 198 from the line 200 to the line 202, through the gate element 204 and through the control windings of the gate elements 178 and 174, thus rendering the latter two gates resistive. Similarly, a B' pulse on the line 196 is directed by the resistive state of gate element 206 (binary 1) from the line 208 to the line 210 and through gate element 212, thus rendering the gate element 170 resistive. The B' pulse continues on line 214 to the top of the adding tree. Thus, with a binary 1 in flip-flop 150*a* and a binary 1 in flip-flop 150*b*, the gate elements 170, 174 and 178 are resistive whereas the gate elements 168, 172 and 176** are superconductive.

The B' pulse on line 214 therefore flows through lines 216 and 218, rendering the cryotron gate 182 resistive. The resistive state of gate 182 causes current to flow in the right hand leg of flip-flop **150*c* to represent the storage of a binary 0. This is correct since the binary 1 of flip-flop 150*a* added to the binary 1 of flip-flop 150*b* results in a binary 0 sum with a binary 1 carry. The binary 0 is stored in flip-flop 150*c* and the binary 1 carry flows out on the line 220**.

A binary 1 in flip-flop **150*a* and a binary 0 in flip-flop 150*b*, or a binary 0 in flip-flop 150*a* and a binary 1 in flip-flop 150*b* causes the current to emerge from the adding tree on the line 222 to write a binary 1 in flip-flop 150*c* by rendering gate 184 resistive and to emerge on a line 224 which is the equivalent of a binary 0 or no carry. A binary 0 in flip-flop 150*a* and a binary 0 in flip-flop 150*b* causes the current from line 214 to flow through lines 226 and 228 to write a binary 0 in the flip-flop 150*c* and emerge on the 0 carry line 224**.

Thus the function of the sum register is to enter a binary count in the flip-flop **150*b*, add that count to the contents of flip-flop 150*a*, to store the sum in flip-flop 150*c* and to transfer the appropriate carry, 0 or 1, to the appropriate first carry register 16. Thereafter the contents of flip-flop 150*c* are transferred to flip-flop 150*a* by a C' pulse applied to line 183 preparatory to adding the next count. A C' pulse on line 183 is directed to the line 185 by the binary 0 state of flip-flop 150*c* as represented by the resistive state of gate element 191, and to the line 184 by the binary 1 state of flip-flop 150*c*, as represented by the resistive state of gate element 190, to store a corresponding binary value in gate elements 164 and 166 of flip-flop 150*a*. The C' pulse then emerges from the line 186. Current is introduced into the flip-flops 150*a*, 150*b* and 150*c* through a line 230 and emerges on a line 232** from which it is fed either directly or through other circuits to ground.

Referring to FIGURE 4*b*, a block representation is shown of the sum register illustrated in detail in FIGURE 4*a*. This representation of FIGURE 4*b* is utilized in FIGURES 1*a* and 1*b*.

*Carry register*

Referring to FIGURE 5*a*, a circuit schematic illustrative of the carry registers 16 and 18 is shown. In the following description reference will be made to a carry register 16–1 but it will be understood that the same description applies to all carry registers 16 and 18. The register 16–1 is divided into three sections, **16–1*a*, 16–1*b* and 16–1*c*. The section 16–1*a* includes a flip-flop 240*a* and a flip-flop 242. The section 16–1*b* includes a flip-flop 240*b* and the section 16–1*c* includes a flip-flop 240*c***. Each flip-flop is adapted to store a binary value, a binary 1 being represented by current in the left hand leg of the flip-flop and a binary 0 being represented by current in the right hand leg of the flip-flop.

In a manner similar to that described with reference to the sum registers in FIGURE 4*a*, a value is entered in flip-flop **240*b*** and, by an adding tree including gate elements 244, 246, 248, 250, 252 and 253, the values in flip-flops 240a and 240b are added and the sum is stored in gate elements 254, 255 and 256 of flip-flop 240c. Thereafter, the contents of flip-flop 240c are transferred by a transfer pulse (C′) on line 257, gate elements 258 and 260, and lines 262 and 264 to gate elements 266 and 268 of flip-flop 240a. The current then emerges from the carry register on a line 271.

Binary 0's and binary 1's are entered in flip-flop 240b by B′ pulses on lines 270 and 272 respectively. A binary 0 representing current on the line 270 renders gate element 274 resistive whereas a binary 1 representing input on line 272 renders gate element 276 resistive. With binary values entered in flip-flops 240a and 240b, a B′ pulse applied to a line 280 conditions the gate elements 248, 250, 252 and 254 of the adding tree in accordance with the binary value in flip-flop 240b. The B′ pulse applied to the line 282 conditions the gate elements 244 and 246 of the adding tree in accordance with the value in flip-flop 240a. The B′ pulse thereafter is applied to either line 270 or 272 in accordance with whether a binary 0 or binary 1 carry is being propagated. The input on line 270 or 272 may alter the conditioning of the adding tree by changing the value in the flip-flop 240b. The B′ pulse then flows through the adding tree and, in the manner described with reference to the sum registers, enters the sum of registers 240a and 240b in register 240c and produces the proper 0 or 1 carry on line 284 or 286 respectively. By reference to FIGS. 1a and 1b and the subsequent description thereof, it is apparent that the B′ pulse inputs to lines 280, 282 and 270 (272) are actually the same pulse directed through devious paths.

In a manner similar to that described with respect to the word memory, bit register 10, an A pulse applied to the line 124 (which actually extends from a register 10) continues through the carry register 16 on the line 124 if the flip-flop 240a stores a binary 0. If the flip-flop 240a contains a binary 1, the A pulse is diverted through a line 291 forming the control winding for a gate element 294 in flip-flop 242 and through gate element 296 of flip-flop 240a and a line 292 to the line 128 (see FIG. 1a and 1b).

The current in line 291 renders gate element 294 resistive diverting current from the right hand leg of flip-flop 242 to the left hand leg and making gate element 302 superconductive.

Following the A pulse, a B pulse applied to the line 132′ flows through the gate element 302 and the control winding of gate element 304 of flip-flop 240a to reset the flip-flop 240a to its binary 0 state. A C pulse applied to line 130 extending from a word memory bit register 10 flows through gate element 308 of flip-flop 242 to reset this flip-flop to its 0 state.

Direct current is applied to the flip-flops 240a, 240b and 240c through a line 310 and flows to ground through a line 312. Current is applied to flip-flop 242 through a line 314 and flows to ground through a line 316.

Referring to FIGURE 5b, a block representative of the circuit shown in FIGURE 5a is illustrated. This block representation is utilized in FIGURES 1a and 1b. Identical blocks represent carry registers 16 and 18.

*End of readout circuit*

Referring to FIGURE 6a, an end-of-readout circuit 20 is illustrated. The circuit includes a flip-flop 320 adapted to store binary 0 and binary 1 representations. Current in the left hand line 322 represents a binary 1 and current in the right hand line 324 represents a binary 0. An A pulse applied on line 124 renders a cryotron gate element 328 resistive thus diverting current from a line 330 to the line 322 to represent a binary 1. Current applied to the line 330 flows through a line 332 to ground. A C′ pulse on a line 334 renders gate element 336 resistive, thus diverting current back to the line 324 to represent a binary 0. The line 324 forms the control winding for gate elements 338 to 343. The gate elements 338 to 343 are connected in lines 345 to 350 respectively.

An end-of-readout circuit 20 is connected in each column of elements as shown in FIGURES 1a and 1b and is operative to indicate when all binary 1 bits in the corresponding column of word memory and all carries in registers 16 and 18 of the associated column have been added into the sum registers. When all such binary 1's have been added, the next succeeding A pulse on line 124 switches the flip-flop 320 to the binary 1 state. After each A pulse, B′ pulses are applied to the lines 345 to 350 to readout the contents of the sum registers, provided that all binary 1's in all columns have been added. A C′ pulse is applied to the line 334 following the B′ pulses to reset any flip-flop 320 to the binary 0 state.

When all end-of-readout circuits are actuated (set to binary 1) at the end of a given A pulse time, the following B′ pulses are permitted to pass through all end-of-readout circuits 20 on line 345 to 350 to the lines 193 of associated sum registers to readout the contents of the registers.

*Pulse generator*

This system is operated by repetitive sequences of pulses variously designated A, B, C, B′, C′, B″, C″, C‴. It is well known that pulse generators may be constructed to provide any desired sequence of pulses and therefore such a generator is not shown or described herein. Since the means for generating the pulses do not in themselves constitute invention, the sources of the various pulses, for convenience of illustration, are shown schematically as switches which are referred to as being opened and closed to produce the desired pulses.

*Circuit description*

Referring to FIGURES 1a and 1b, a block representation of the system is shown utilizing the block diagrams shown in FIGURES 2c, 4b, 5b and 6b.

The system is operated by a series of pulses designated A, B and C which are entered into the word memory bit registers 10–1 to 10–4 and into carry registers 18–3 and 16–5. Each of the pulses A, B and C is a direct current (D.C.) pulse and in each case the current source is represented by a terminal labelled with a plus (+) sign. The A pulses are applied to the various memory registers 10 and to the carry registers 18–3 and 16–5 through switches designated 360–1 to 360–6. The B pulses are applied through switches designated 362–1 to 362–6. The C pulses are applied through switches designated 364–1 to 364–6.

B′ pulses are applied, coincidently with the B pulses, to the lines 194 of the sum registers 14 (see timing chart FIG. 7). These B′ pulses originate at terminals labelled plus (+) and are connected to the lines 194 through switches designated 366–1 to 366–6. B″ pulses are applied, coincidently with the B and B′ pulses, through switches 370–1 to 370–6 to the lines 345 to 350 leading into the end-of-readout circuit 20–1.

C′ pulses are applied, coincidently with the C pulses, through switches designated 372–1 to 372–6 to the lines 183 of the sum registers 14–1 to 14–6. A C″ pulse is applied, coincident with the C and C′ pulses, through a switch 374 to the line 160 of sum register 14–1. A C‴ pulse is applied, coincidently with the C, C′ and C″ pulses through a switch 376 to the line 334 leading into the end-of-readout circuit 20–1. The foregoing pulses as well as other inputs to the circuit are illustrated in the timing chart, FIGURE 7.

In accordance with the earlier example, word 1 of the memory is assumed to contain the binary number 15 (1111), words 2, 3 and 4 the binary number 7 (0111), and word 5 the binary number 9 (1001). The carry registers 16 and 18, the end-of-readout circuits 20 and the sum registers 14 are assumed to be initially reset to 0. Current is applied from terminals designated plus (+) through switches designated 378–1 to 378–5 to the lines 76–1 to 76–5 threading the word memory bit registers 10. In the manner described hereinbefore, the currents on the lines 76 transfer the contents of the flip-flops 26 to the corresponding flip-flops 88. A pulses are applied through the switches 360–1 to 360–6 and are effective, in the manner described, to apply a pulse to each of the lines 128 leading from the word 1 bit positions 1, 2, 3 and 4, since each bit position contains a binary 1. A pulses applied through switches 360–5 and 360–6 proceed, in the described manner through the lines 124 to the end-of-readout circuits 20–5 and 20–6. The circuits 20–5 and 20–6 are thus set to their binary 1 states. The currents on lines 128–1 to 128–4 store binary 1's in the corresponding sum register sections 14–1*b*, 14–2*b*, 14–3*b* and 14–4*b*.

The B, B′ and B″ pulses are then applied through their respective switches. The B pulses applied through switches 362 reset the bit registers of word 1 to the binary 0 state. The B pulses applied through switches 362–5 and 362–6 are ineffective since the carry registers 18–3 and 16–5 are already in their binary 0 states. The B″ pulses applied through switches 370–1 to 370–6 interrogate the six end-of-readout circuits 20 but are ineffective since circuits 20–1 to 20–4 are in their binary 0 states and the currents applied through the switches 370 are blocked.

The B′ pulses applied through the switches 366–1 to 366–6 add the binary contents of sum register "*b*" sections to the binary contents of the corresponding "*a*" sections. Referring, for example, to the register 14–1, the B′ pulse applied through the switch 366–1 flows through line 194 into the register section 14–1*b*, through the line 195 to to the line 279 to carry register 16–1, through the output line 280 of register 16–1 and the input line 279 of register 18–1, through the lines 280, 282 and 283 of the register 18–1, through lines 282 and 283 of register 16–1 and line 196 of sum register 14–1. The B′ pulse then flows through the adding tree of register 14–1 to add the binary 0 in section 14–1*a* to the binary 1 in section 14–1*b* and store the binary 1 sum in register 14–1*c*. A binary 0 carry pulse emerges from register 14–1 on the line 224 and is applied to the line 270 of carry register 16–1. This B′ pulse flows through the adding tree of register 16–1 to add the binary 0 in section 16–1*a*; to the binary 0 in section 16–1*b* and store the binary 0 sum in section 16–1. The B′ pulse emerges from register 16–1 on the binary 0 carry line 284 and is applied to the line 270 of carry register 18–1 where it similarly adds the binary 0's in sections 18–1*a* and 18–1*b* and stores the binary 0 sum in 18–1*c*. The current emerges on the binary 0 carry line 284 and flows to ground. The B′ pulses applied through switches 366–2 to 366–4 accomplish the foregoing function in exactly the same manner. The B′ pulses applied through switches 366–5 and 366–6 are ineffective since they are operating on empty registers. Hereinafter reference to 1's and 0's will be understood to mean binary 1's and binary 0's.

The C, C′, C″ and C‴ pulses are then applied. The C pulses applied through the switches 364–1 to 364–4 are effective to reset the flip-flops 90 in word 1 bit positions 1, 2, 3 and 4 to their 0 states, since each was set to the 1 state when the binary 1 was read therefrom. The C pulses applied through switches 364–5 and 364–6 are ineffective since the corresponding flip-flops 242 in carry registers 18–3 and 16–5 were not set to the 1 condition.

The C″ pulse applied through the switch 374 flows through the "*b*" sections of all sum registers 14 and resets to the 0 state those registers which contained a 1, in this case registers 14–1*b*, 14–2*b*, 14–3*b* and 14–4*b*. The C‴ pulse applied through the switch 376 resets the end-of-readout circuits 20–5 and 20–6 to their 0 states. The registers 20–1 through 20–4 were already in their 0 states.

The C′ pulses applied through the switches 372–1 to 372–6 are effective to transfer the contents of the "*c*" sections of the sum registers 14, carry registers 16 and carry registers 18 to the "*a*" sections thereof. For example, the C′ pulse applied through the switch 372–1 flows through the line 183 into the sections 14–1*c* and transfers the 1 stored therein to the section 14–1*a*. The C′ pulse then flows through the line 186 and the line 257 into the register section 16–1*c*. Since the section 16–1*c* contains a 0, a 0 is written in section 16–1*a* and the C′ pulse emerges on the line 271. The C′ pulse continues through the line 257 into carry register 18–1 where it writes a 0 in section 18–1*a*. This pulse then flows through the line 271 to ground. In a similar manner the 1's in sum register sections 14–2*c*, 14–3*c* and 14–4*c* are transferred to the corresponding register sections 14–2*a*, 14–3*a* and 14–4*a*.

This is the end of a first adding cycle. A second adding cycle is commenced by again closing the switches 360–1 to 360–6 to apply A pulses to the corresponding lines 124. The A pulses enter 1's in the sum register sections 14–1*b*, 14–2*b*, 14–3*b* and 14–4*b* via corresponding lines 128. The 1's read out are those from W5, B4; W2, B3; W2, B2; W2, B1. The A pulses applied to switches 360–5 and 360–6 flow into the corresponding end-of-readout circuit 20–5 and 20–6, setting these circuits to their 1 states.

The B″ pulses are applied during each adding cycle to the switches 370 and are ineffective during each cycle until all adding of 1's from memory and carries from the carry registers is complete. Therefore, further reference will not be made to the B″ pulses until this end of adding condition is achieved. Similarly, reference to the C‴ pulses will not be made since a C‴ pulse is applied during each adding cycle to reset to 0 any circuits 20 which have been set to their 1 state. Similarly, reference will not be made to the C″ pulses which are applied each adding cycle to reset the sections "*b*" of all sum registers 14 to the 0 state.

Following the A pulses in the second adding cycle, the B′ pulse applied through switch 366–1 follows the previously described path and is effective to add the 1 in section 14–1*a* to the 1 in section 14–1*b* storing the 0 sum in section 14–1*c* and propagating a 1 carry on line 220 to section 16–1*b* of carry register 16–1. This same B′ pulse is effective to add the 0 in section 16–1*a* to the 1 in 16–1*b*, storing the 1 sum in section 16–1*c* and propagating a 0 carry to the carry register 18–1. The carry register 18–1 remains set at 0.

Similarly, the B′ pulse applied to switch 366–2 adds the 1 in section 14–2*a* to the 1 in section 14–2*b* storing the 0 sum in section 14–2*c* and entering the 1 carry in section 16–2*b* of register 16–2. This same B′ pulse adds the 0 in section 16–2*a* to the 1 in section 16–2*b* and stores the 1 sum in section 16–2*c*. The 0 carry to register 18–2 leaves this register set to 0.

The effect of the B′ pulses applied through switches 366–3 and 366–4 is identical to the foregoing description of the B′ pulses applied to switches 366–1 and 366–2. The B′ pulses applied to switches 366–4 and 366–5 are ineffective due to the 0 contents of the associated registers.

The C′ pulses applied to the switches 372–1 through 372–6 are effective to transfer the contents of all "*c*" sections of sum registers and carry registers to the corresponding "*a*" sections. At this point in the operation, carry registers 16–1, 16–2, 16–3 and 16–4 store 1's. All other registers store 0's.

A third adding cycle is initiated by again closing switches 360–1 to 360–6. In this adding cycle the only remaining 1's in the memory 10 are in bit positions 1, 2, and 3. The 1's from W3, B3; W3, B2 and W3, B1 are entered into register sections 14–3*b*, 14–2*b* and 14–1*b* respectively. The A pulse through switch 360–4 flows through the associated line 124, and through a carry register 18–2 to readout the 1 in register 16–3 and enter it in register section 14–4*b*. Similarly, the A pulse through switch 360–5 reads the 1 from register 16–4 to register section 14–5*b*. The A pulse through switch 360–6 turns on the end-of-readout circuit 20–6. The following B pulses reset the W3, B3; W3, B2; and W3, B1 flip-flops 88 and the flip-flops 240*a* of registers 16–3 and 16–4.

The B′ pulse applied through the switch 366–1 adds the 0 in section 14–1*a* to the 1 in section 14–1*b* and stores the 1 sum in section 14–1*c*. The 0 carry on the line 224 is applied to section 16–1*b* of register 16–1. This carry is added to the 1 in section 16-1*a,* and the 1 sum is stored in the section 16–1*c.* The 0 carry to register 18–1 leaves this register set at 0.

The B′ pulse applied through switch 366–2 similarly adds the 0 and 1 in sections 14–2*a* and 14–2*b* and enters the 1 sum in section 14–2*c*. The 0 carry to section 16–2 is added to the 1 in section 16–2*a* and the 1 sum is stored in section 16–2*c*. The 0 carry to register 18–2 leaves this register set at 0. The B′ pulse applied through switch 366–3 adds the 0 in register 14–3*a* to the 1 in register 14–3*b* storing the 1 sum in section 14–3*c* and propagating a 0 carry to register 16–3. This 0 carry is added to the 0 in section 16–3*a* and the 0 sum is stored in the section 16–3*c*. The 0 carry to register 18–3 leaves this register set at 0. The B′ pulse applied to register 14–4 adds the 1 in section 14-4*b* to the 0 in section 14–4*a*, storing the 1 sum in section 14–4*c* and propagating a 0 carry to register 16–4 where it is added to the 0 in section 16–4*a*. The B′ pulse applied to register 14–5 adds the 1 in section 14–5*b* to the 0 in section 14–5*a, storing* the sum in section 14–5*c* and propagating a 0 carry to register 16–5. The B′ pulse to register 14–6 is ineffective due to the 0 contents of the associated registers.

The C′ pulses applied to switches 372 transfer the contents of all *"c"* sections of registers 14, 16 and 18 to the corresponding *"a"* sections. At this point, registers 14–1, 14–2, 14–3, 14–4, 14–5, 16–1 and 16–2 store 1's. All other registers store 0's.

A fourth adding cycle is initiated by closing the switches 360–1 to 360–6. The A pulses read 1's from W3, B3; W3, B2 and W3, B1. The A pulses through switches 360–4, 360–5 and 360–6 are effective only to turn ON the corresponding end-of-readout circuits 20. The 1's in carry registers 16–1 and 16–2 are not read out since the associated A pulses are utilized to read 1's from memory.

The B′ pulse applied through switch 366–1 adds the 1 in register section 14–1*b* to the 1 in section 14–1*a* storing the 0 sum in section 14–1*c* and propagating a 1 carry to register 16–1. This same pulse adds the 1 in section 16–1*b* to the 1 in section 16–1*a* storing the 0 sum in section 16–1*c* and propagating a 1 carry to register 18–1. The B′ pulse applied to switch 366–2 adds the 1 in section 14–2*a* to the 1 and section 14–2*b* storing the 0 sum in section 14–2*c* and propagating a 1 carry to register 16–2. The 1's in register sections 16–2*a* and 16–2*b* are added. The 0 sum is stored in section 16–2*c* and the 1 carry is propagated to register 18–2.

The B′ pulse applied through switch 366–3 adds the 1 in section 14–3*b* to the 1 in section 14–3*a* storing the 0 sum in section 14–3*c* and propagating a 1 carry to register 16–3 where it is added to the 0 in section 16–3*a*. The 1 sum is entered into section 16–3*c* and a 0 carry is propagated to register 18–3.

The B′ pulse applied to registers 14–4 and 14–5 add the 1's in the respective sections *"a"* to the 0's in respective sections *"b,"* storing the 1 sums in respective sections *"c."* The B′ pulse to register 14–6 is ineffective due to the binary 0 contents of that register.

Again the C′ pulses transfer the contents of the *"c"* sections of registers 14, 16 and 18 to the corresponding *"a"* sections. At this point only registers 14–4, 14–5, 16–3, 18–1 and 18–2 store 1's .

A fifth adding cycle is initiated during which a 1 is entered from word five bit position 1 into register section 14–1*b*. A 1 is read from carry register 18–1 into register section 14–3*b*. A 1 is read from carry register 18–2 into section 14–4*b*. Register sections 14–2*b,* 14–5*b* and 14–6*b* remain set at 0.

The B′ pulse applied to register 14–1 adds the 0 in section 14–1*a* to the 1 in section 14–1*b* entering the 1 sum in section 14–1*c* and propagating a 0 to carry to register 16–1. The B′ pulse to register 14–3 similarly enters the 1 sum in section 14–3*c* and propagates a 0 carry which is added to the 1 in register 16–3. The B′ pulse to register 14–4 adds the 1's in sections *"a"* and *"b"* entering the 0 sum in section 14–4*c* and propagating a 1 carry to register 16–4. The B′ pulse to register 14–5 adds the 1 in section 14–5*a* to the 0 in section 14–5*b* enter in the 1 sum in section 14–5*c* and propagating a 0 carry to section 16–5. At this point only registers 14–1, 14–3, 14–5, 16–3 and 16–4 contain 1's.

All 1's from word memory 10 have now been read out to the adding circuits. The A pulses applied to switches 360 in a sixth adding cycle are effective to read the 1 carries from carry registers 16–3 and 16–4. The A pulses applied to switches 360–4 and 360–5 transfer the 1's from register 16–3 and 16–4 to register sections 14–4*b* and 14–5*b*. The B′ pulse adds the 0 in section 14–4*a* to the 1 in section 14–4*b,* storing the 1 sum in section 14–4*c* and propagating a 0 carry to register 16–4. The B′ pulse to register 14–5 adds the two 1's, entering the 0 sum in section 14–5*c* and propagating a 1 carry to register 16–5. At the end of this sixth adding cycle, registers 14–1, 14–3, 14–4 and 16–5 contain 1's.

A seventh adding cycle is initiated to transfer the 1 carry from register 16–5 to register 14–6. This completes the adding operation and, during the next adding cycle, all A pulses flow directly to the associated end-of-readout circuits 20 setting all of them to their 1 states and permitting the B pulses applied to switches 370–1 to 370–6 to flow through the lines 345–350 and the lines 193 of the sum registers 14, to read out the contents of these registers on lines 189 and 192. At this point the registers 14–1, 14–3, 14–4 and 14–6 contain 1's which represent a sum of 45.

As stated hereinbefore, in a large memory, additional orders of carry registers beyond registers beyond registers 18 will be required to store carries, since a carry is not read out of a carry register until all 1's in the corresponding column of memory have been read out. However, the addition of these other carry registers is merely an extension of the counter disclosed herein. For example, the first order counter includes the sum register 14–1, carry register 16–1 and carry register 18–1. It is a simple matter to extend this counter to include any number of additional carry registers identical to the registers 16–1 and 18–1 and interconnected in the same manner. A variation of this counter system consists of passing the pulses A, B and C through the carry registers 16 before passing them through the word memory. In this instance, the second order of carry registers 18 is not required since a 1 carry in a register 16 is read out by the next A pulse following the B′ pulse which stored the carry in the register 16. Each time a 1 carry is entered in a register 16, it is read out in the next adding cycle in preference to a 1 from the corresponding column of word memory. This reduction in carry registers is offset by a sacrifice in speed since the immediate reading out of each carry delays the reading out of memory data. For example, with this variation, the addition of 128 1's in the low order position requires 64 adding cycles for reading the carries from register 16–1 plus a cycle for each 1 stored in the second order column of memory. Using the multiple orders of carry registers, the 64 carries would be represented by a single 1 in a seventh order carry register which would be read out in a single cycle as compared with the aforementioned 64 cycles.

While the invention has been particularly shown and described with reference to preferred embodiments thereof, it will be understood by those skilled in the art that various changes in form and details may be made therein without departing from the spirit and scope of the invention.

What is claimed is:

1. A memory readout system comprising, in combination, a memory consisting of $n \times m$ storage means arranged in $n$ word rows and $m$ bit columns, each said storage means settable selectively to opposite binary states, readout means associated with each said storage means and operable by a readout signal applied thereto to produce an output signal on a first output line when the corresponding said storage means is in one binary state and on a second output line when the corresponding said storage means is in the opposite binary state and means connecting said readout means of each said storage means, after the first said storage means in each said column, to said first output line of the preceding storage means in the same column.

2. A memory readout system comprising, in combination, a memory consisting of $n \times m$ binary bit registers arranged in $n$ word rows and m bit columns, binary storage means associated with each said register and settable to the binary state of the associated register, readout means associated with each said storage means and operable by a readout signal applied thereto to produce an output signal on a first output line when the corresponding said storage means is in one binary state and on a second output line when the corresponding said storage means is in the opposite binary state and means connecting said readout means of each said storage means, after the first said storage means in each column, to said first output line of the preceding storage means in the same column.

3. A memory readout system comprising, in combination, a memory consisting of $n \times m$ storage means arranged in $n$ word rows and $m$ bit columns, each said storage means settable selectively to opposite binary states, readout means associated with each said storage means and operable by a readout signal applied thereto to produce an output signal on a first output line when the corresponding said storage means is in one binary state and on a second output line when the corresponding said storage means is in the opposite binary state, means connecting said readout means of each said storage means, after the first said storage means in each column, to said first output line of the preceding storage means in the same column, and reset means associated with each said storage means and operable by a reset signal applied thereto to set the corresponding said storage means to said one state whereby a succeeding said readout signal is applied to said readout means of the next succeeding said register.

4. A memory readout system comprising, in combination, a memory consisting of $n \times m$ storage means arranged in $n$ word rows and $m$ bit columns each said means settable selectively to opposite binary states, readout means associated with each said storage means and operable by a readout signal applied thereto to produce an output signal on a first output line when the corresponding said storage means is in one binary state and on a second output line when the corresponding said storage means is in the opposite binary state, means connecting said readout means of each said storage means, after the first said storage means in each column, to said first output line of the preceding storage means in the same column, first reset means associated with each said storage means and operable by a reset signal applied thereto to set the corresponding said storage means to said one state, second reset means associated with each said storage means settable to one binary state by an output signal on the corresponding said second output line and operable in said one state to permit said first reset means to reset the corresponding said storage means, and third reset means associated with each said storage means operable by a reset signal applied thereto to set the associated said second reset means to its opposite binary state.

5. A memory readout and adding system comprising, in combination a memory consisting of $n \times m$ storage means arranged in $n$ word rows and $m$ bit columns and settable selectively to opposite binary states, readout means associated with each said storage means and operable by a readout signal applied thereto to produce an output signal on a first output line when the corresponding said storage means is in one binary state and on a second output line when the corresponding said storage means is in the opposite binary state, means connecting said readout means of each said storage means after the first storage means in each said column to said first output line of the preceding storage means in the same column, an $m$ order binary accumulator arranged in said $m$ columns, means common connecting said second output lines of all said storage means in each column to input means of a corresponding order of said accumlator whereby each signal on said common connecting means enters a count in said corresponding order of said accumulator.

6. The invention of claim 5 including means for asynchronously reading out the contents of said $m$ order accumulator when addition therein is complete.

7. A memory readout and adding system comprising, in combination, a memory consisting of $n \times m$ storage means arranged in $n$ word rows and $m$ bit columns and settable selectively to opposite binary states, readout means associated with each said storage means and operable by a readout signal applied thereto to produce an output signal on a first output line when the corresponding said storage means is in one binary state and on a second output line when the corresponding said storage means is in the opposite binary state, means connecting said readout means of each said storage means after the first storage means in each said column to said first output line of the preceding storage means in the same column, an $m$ order binary accumulator arranged in said $m$ columns, each said order operable to store a first binary digit in a first storage element, to receive a second binary digit in a second storage element, to add said first and second binary digits storing the binary sum in a third storage element and propagating a binary digit carry in accordance with said sum, means common connecting said second output lines of all said storage means in each column to an input terminal of said second storage element of a corresponding order of said accumulator whereby each signal on said common connecting means enters a count in said corresponding order of said accumulator.

8. A memory readout and adding system comprising, in combination, a memory consisting of $n \times m$ storage means arranged in $n$ word rows and $m$ bit columns and settable selectively to opposite binary states, readout means associated with each said storage means and operable by a readout signal applied thereto to produce an output signal on a first output line when the corresponding said storage means is in one binary state and on a second output line when the corresponding said storage means is in the opposite binary state, means connecting said readout means of each said storage means after the first storage means in each said column to said first output line of the preceding storage means in the same column, an $m$ order binary accumulator arranged in said $m$ columns, each said order operable to store a first binary digit in a first storage element, to receive a second binary digit in a second storage elment, to add said first and second binary digits storing the binary sum in a third storage element and propagating a binary digit carry in accordance with said sum, means common connecting said second output lines of all said storage means in each said column to an input terminal of said second storage element of a corresponding order of said accumulator whereby each signal on said common connecting means enters a count in the corresponding order of said accumulator, binary carry registers corresponding to each order of said accumulator, each said carry register arranged in a said column corresponding to the next higher order from the associated said accumulator, readout means associated with each said carry register and operable by a readout signal applied thereto to produce an output signal on a first outline line when the carry register is in one binary state and on a second output line when the carry register is in the opposite binary state, means connecting said readout means of each said carry register to said first output line of the *m*th said storage means in the corresponding said column and means connecting said second output line of each said carry register to the said common connecting means of the corresponding said column.

9. The invention of claim 8 including means for asynchronously reading out the contents of said *m* order accumulator when addition of data from said memory and said carry registers is complete.

References Cited by the Examiner

FOREIGN PATENTS 841,277 7/60 Great Britain.

OTHER REFERENCES

Pages 4–22, 4–23 and 2–22a to 4–23a, 2/47, "Progress Report on EDVAC," vol. 2, University of Pennsylvania.

MALCOLM A. MORRISON, *Primary Examiner.*

WALTER W. BURNS, Jr., *Examiner.*